United States Patent [19]

Berglund

[11] 4,298,575

[45] Nov. 3, 1981

[54] PIPETTING AND DOSING DEVICE

[75] Inventor: Erling Berglund, Järfälla, Sweden

[73] Assignee: LKB Clinicon Aktiebolag, Bromma, Sweden

[21] Appl. No.: 70,268

[22] Filed: Aug. 27, 1979

[30] Foreign Application Priority Data

Sep. 4, 1978 [SE] Sweden ............................... 7809267

[51] Int. Cl.³ .......................... B01L 3/02; G01N 1/14

[52] U.S. Cl. ................................. 73/864.13; 222/309; 422/100

[58] Field of Search ........ 422/100; 73/425.6, 425.4 P; 222/309, 409

[56] References Cited

U.S. PATENT DOCUMENTS

| | | | |
|---|---|---|---|
| 2,602,446 | 7/1952 | Glass et al. | 128/218 |
| 2,952,386 | 9/1960 | Knights, Jr. | 222/409 |
| 3,173,575 | 3/1965 | Gugerli et al. | 222/1 |
| 3,216,616 | 11/1965 | Blankenship, Jr. | 222/47 |
| 3,701,345 | 10/1972 | Hellman et al. | 128/655 |
| 3,738,493 | 6/1973 | Cummins | 210/198 C |
| 3,847,507 | 11/1974 | Sakiyama et al. | 417/22 |
| 3,858,581 | 1/1975 | Kamen | 128/DIG. 1 |
| 3,990,312 | 11/1976 | Koukol | 73/425.6 X |
| 4,084,730 | 4/1978 | Franke et al. | 73/425.6 X |
| 4,086,062 | 4/1978 | Hach | 422/100 |
| 4,154,108 | 5/1979 | Vollinger et al. | 73/425.6 X |

FOREIGN PATENT DOCUMENTS

| | | |
|---|---|---|
| 1031950 | 6/1966 | United Kingdom . |
| 1165950 | 1/1969 | United Kingdom . |
| 1202079 | 12/1970 | United Kingdom . |
| 1441983 | 7/1976 | United Kingdom . |

*Primary Examiner*—Michael S. Marcus

[57] ABSTRACT

A pipetting and dosing device, in particular for use in automatic clinical analysis apparatuses, for dosing and dispensing accurate liquid volumes, such as samples and reagents, comprises an internally cylindrical suction pipe (5) with a conically tapering distal end (17) with a central opening (18), a piston (7) axially movable within the suction pipe while sealing against the inner wall of the pipe, and drive means (8–13) for moving the piston axially over well-defined distances in the suction pipe for, respectively, sucking up and discharging predeterminable volumes of liquid. The end of the piston facing the conically tapering distal end (17) of the suction pipe (5) is provided with a conical tip (*7a*) having an apex angle of the conically tapering end of the suction pipe and this conical piston tip (*7a*), or alternatively the conically tapering end (17) of the suction pipe, is made of a resiliently deformable material. At the end of the discharge movement of the piston in the suction pipe the conical tip (*7a*) of the piston is moved into abutment against the conically tapering end (17) of the suction pipe with such an axial force that, through elastic deformation of the piston tip or alternatively the conically tapering end of the suction pipe, the piston tip and the conically tapering end of the suction pipe are brought into complete conformity without any residual interspace remaining therebetween.

9 Claims, 1 Drawing Figure

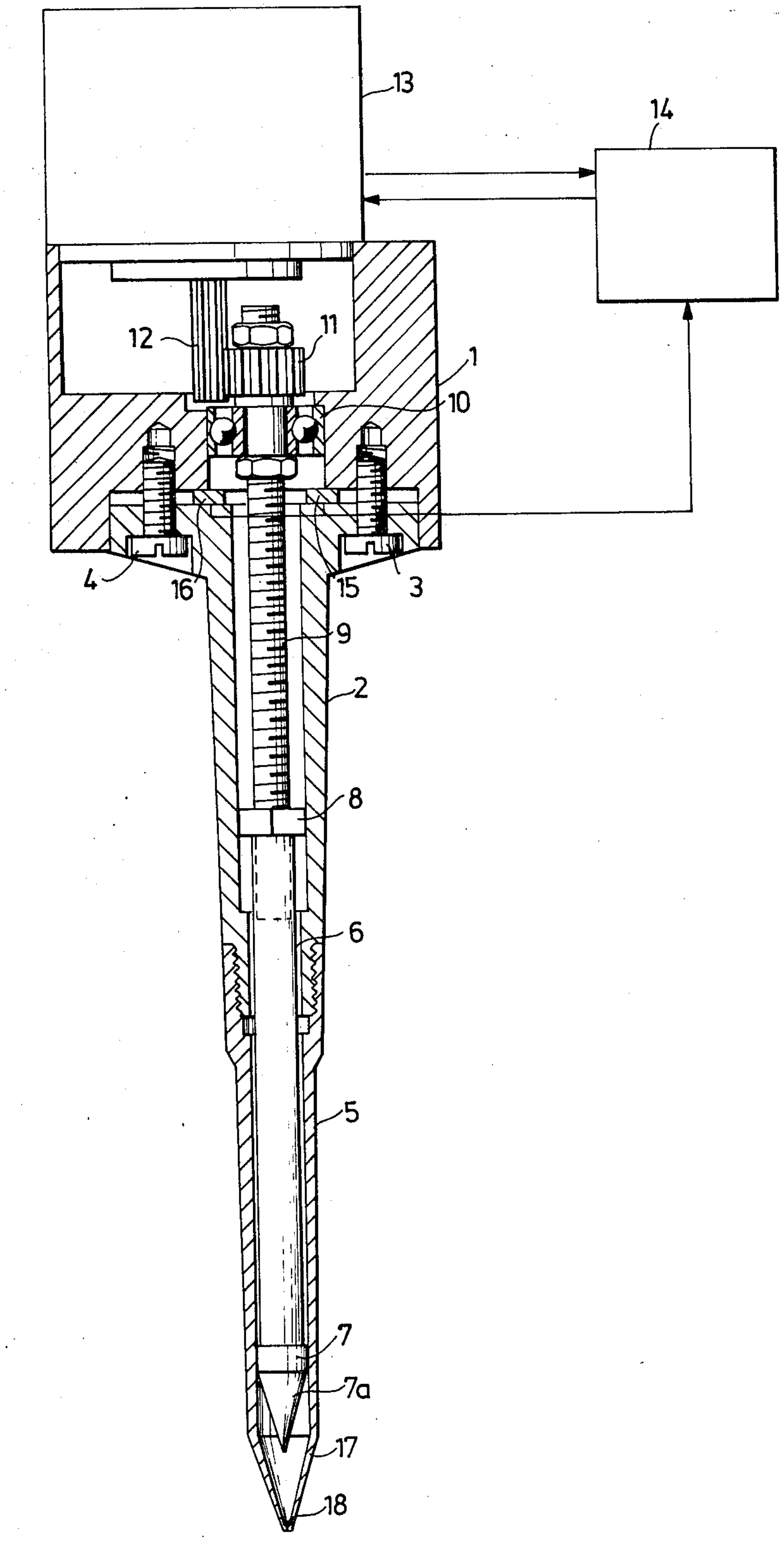
13
14
12
11
1
10
4
16
15
3
9
2
8
6
5
7
7a
17
18

PIPETTING AND DOSING DEVICE

The present invention concerns a pipetting and dosing device for the accurate dosage of predeterminable liquid volumes, which device is of the type comprising an internally cylindrical suction pipe having a conically tapering distal end with a central opening and a piston axially movable within said suction pipe while sealing against the inner wall of the pipe, the end of the piston facing the distal end of the suction pipe being provided with a conical tip substantially corresponding to the conically tapering end of the suction pipe, and drive means coupled to the piston for moving it axially in a well-defined manner within said suction pipe, whereby predeterminable liquid volumes can be, respectively, sucked up into and discharged from the pipe through the opening in its distal end. Such a pipetting and dosing device can be used for instance in automatic apparatuses for clinical analysis, in which apparatuses very accurately defined volumes of liquid samples, such as blood serum etc., and reagents to be mixed with the samples shall be measured and dispensed into cuvettes in which reactions between the samples and reagents take place, whereafter the results of these reactions are studied, for instance photometrically, for analysing the samples.

When dosing and transferring large numbers of samples to an automatic analysis apparatus it is of primary importance that the dosing and transferring device is of such a design that no contamination can take place between different samples transferred after one another to different cuvettes with the use of the same dosing and transferring device. Therefore, it is necessary that the dosing and transferring device can be cleaned easily and effectively between subsequent samples and that after the cleaning operation no residues of the cleaning liquid, usually pure water, remain in the dosing and transferring device, which could result in a dilution of the next sample to be transferred. The same conditions must be satisfied when such a dosing and transferring device is used in an automatic analysis apparatus for dosing and dispensing a succession of different reagents to different cuvettes. Further, the volumes of liquid, i.e. samples and reagents, to be transferred to the reaction and measuring cuvettes in such an apparatus are very small, often of the order of a few microliters, and in spite of this the dosing must be very accurate as to the volumes being transferred. This means that the necessary accuracy might be jeopardized if even only a single drop of sample or reagent remains within the pipetting and dosing device or on the tip thereof instead of being dispensed into the cuvette. Consequently, it is a mandatory requirement in connection with a pipetting and dosing device of the kind described above that the device can be emptied completely so that no residues of sample or reagent will remain at the distal end of the suction pipe after the completion of the discharging or dispensing stroke of the piston. Thus, no interspace should exist between the tip of the piston and the conical tapering distal end of the suction pipe, when the discharge stroke of the piston has been completed. Further, it is also necessary that the axial movements of the piston within the suction pipe can be controlled in a very accurate manner, as it is realized that the axial length of the piston strokes determines the volumes of liquid being sucked up into the suction pipe and subsequently dispensed.

A primary object of the present invention is therefore to provide an improved pipetting and dosing device of the kind described above, in which the above mentioned requirements are satisfied in that the suction pipe is emptied accurately and completely at the discharging stroke of the piston without any residues of liquid remaining within or at the distal end of the suction pipe and in that the position of the piston within the suction pipe and thus the axial length of the piston strokes can be controlled very accurately.

According to the invention this object is achieved in that the conical tip of the piston has an apex angle which is somewhat larger than the apex angle of the conically tapering distal end of the suction pipe and in that one of these two elements, the tip of the piston and the tapering end of the suction pipe, is made of a resiliently deformable material, whereby upon movement of the piston tip into abutment against the conically tapering end of the suction pipe at the end of the discharge stroke of the piston the conical tip of the piston and the conically tapering end of the suction pipe will, due to elastic deformation of the deformable element, be brought into complete conformity without any residual interspace there between, in which interspace a residue of liquid could remain.

A preferred embodiment of the device according to the invention comprises transducer means for detecting the prevailing axial force between the piston and the suction pipe and for generating a corresponding signal to control means for the drive means for the axial movement of the piston. These control means are responsive to the transducer signal to interrupt the discharge movement of the piston, when the axial force between the piston and the suction pipe reaches a predetermined upper limit value as a result of the abutment of the piston tip against the conically tapering end of the suction pipe. This provides in a very advantageous manner a safeguard against breakage or damages of the piston tip or the conically tapering end of the suction pipe in spite of the necessary axial force between these elements in order to produce the required elastic deformation for the elimination of any residual interspace between the piston tip and the tapering end of the suction pipe. The transducer signal provides also an indication of a well-defined end position for the discharge stroke of the piston and this end position can be used in the control means as a reference or datum position for the piston, from which datum position the axial movement of the piston can be determined for the necessary accurate control of the axial length of the piston strokes.

In a preferred embodiment of the invention the control means for the drive means for the piston may include a first counter, which is driven in synchonism with the drive means for the piston so as to contain at any moment a count representing the actual axial position of the piston in the suction pipe relative to said datum position, and a second counter which can be preset according to a predetermined program to counts representing the desired axial positions of the piston in the suction pipe, the operation of the drive means for the piston being controlled on the basis of a comparison between the counts present in said first and second counter.

The invention will now be described in more detail with reference to the accompanying drawing, which shows schematically and by way of example a pipetting and dosing device according to the invention.

The illustrated pipetting and dosing device according to the invention comprises a support housing 1 to which a hollow shaft 2 is attached by means of two bolts 3 and 4. The hollow shaft 2 has a bore with a square cross-section and supports at its lower end a suction or pipetting pipe 5 having a cylindrical bore. The suction pipe 5 has a conically tapering distal end 17 with a central opening 18, through which liquid can be sucked up into the pipe 5 and discharge therefrom, respectively. A piston 7 at the end of a piston rod 6 is axially movable within the suction pipe 5 while sealing against the inner wall thereof. The piston 7 is provided with a conical tip 7*a*. The upper end of the piston rod 6 is connected to a nut 8 which is axially movable but not rotatable within the square bore of the hollow shaft 2. The nut 8 is cooperating with an axial screw 9, which is journalled in the support housing 1 by means of a ball bearing 10. The upper end of the screw 9 is provided with a gear wheel 11, which is in engagement with a pinion on the shaft 12 of a drive motor 13 supported by the support housing 1.

The operation of the drive motor 13 is controlled from a control unit 14 and by driving the motor 13 in the one or the opposite direction it is possible to move the nut 8 and thus also the piston rod 6 and the piston 7 axially upwards and downwards, respectively, within the shaft 2 and the suction pipe 5, respectively. When the piston 7 is moved upwards, liquid can be sucked up into the pipe 5 through the central opening 18 in its conically tapering distal end 17 and it is realized that the liquid volume will be determined by the axial length of the upwards stroke of the piston 7. When the piston 7 is subsequently moved downwards, this liquid volume will be discharged through the opening 18 at the end of the suction pipe 5, provided that no residual interspace remains between the conical piston tip 7*a* and the conical tapering end 17 of the suction pipe 5 at the end of the discharge stroke of the piston 7. In order to satisfy this requirement the conical tip 7*a* of the piston 7 has an apex angle which is somewhat larger than the apex angle of the conically tapering end 17 of the suction pipe and, further, the conical tip 7*a* of the piston 7 is made of a resiliently deformable material. When at the end of the discharge stroke the tip 7*a* of the piston is driven into abutment against the conically tapering end 17 of the suction pipe 5 the elastically deformable piston tip 7*a* will be deformed so as to conform completely to the shape of the conically tapering distal end 17 of the suction pipe, whereby any residual interspace between the piston tip 7*a* and the inner wall of the tapering end 17 of the suction pipe is eliminated. As a consequence hereof no liquid residues will remain within the suction pipe 5 at the distal end thereof after the completion of the discharge stroke of the piston 7. It will be appreciated that, as an alternative, the conically tapering distal end 17 of the suction pipe 5 could be made of a resiliently deformable material instead of the conical tip 7*a* of the piston 7. However, it is believed preferable for practical reasons to make the piston 7 and its conical tip 7*a* of the resilient deformable material.

In order to obtain a well-defined end position for the discharge stroke of the piston 7 and also provide a safeguard against breakage or damages of the conically tapering end 17 of the suction pipe under the influence of the pressure from the piston tip 7*a* at the end of the discharge stroke, one or several pressure transducers 15 and 16, for instance consisting of piezoelectric transducers, are mounted between the upper end of the shaft 2 and the support housing 1 so as to be affected by the prevailing axial force between the piston 7 and the suction pipe 5. It will be appreciated that at the end of the discharge stroke of the piston the tension in the bolts 3 and 4 will increase due to the pressure of the piston tip 7*a* against the conically tapering end 17 of the suction pipe, which results in a corresponding decrease of the pressure upon the pressure transducers 15 and 16. The signal from the pressure transducers 15 and 16 is supplied to the control unit 14 for the drive motor 13 and when this signal attains a value corresponding to a predetermined upper limit value for the axial pressure between the piston tip 7*a* and the conical end 17 of the suction pipe 5, the control unit 14 is designed to respond to this limit value of the transducer to interrupt the rotation of the drive motor 13 and thus also the axial discharge movement of the piston 7.

Said well-defined end position of the discharge stroke of the piston 7, as indicated by the signal from the pressure transducers 15 and 16, can also be used in the control unit 14 as a reference or datum position for the necessary accurate control of the axial movements of the piston 7 within the suction pipe 5, which is necessary for the accurate control of the liquid volumes being transferred with the device. For this purpose the control unit 14 may comprise a microprocessor including a first counter, which is driven in response to the rotation of the drive motor 13 so as to contain at any moment a count representing the actual axial position of the piston 7 in the suction pipe 5, and a second counter which can be preset in accordance with a program to counts representing the desired positions of the piston 7 in the suction pipe 5, and means for comparing the counts present in said two counters and for controlling the operation of the drive motor 13 and thus the axial movement of the piston 7 on the basis of this comparison so that the piston 7 is moved to and stopped in the positions represented by the counts preset in said second counter. The drive motor 13 can preferably consist of a stepping motor, as the operation of such a motor can be controlled very accurately as to its angle of rotation. The control unit 14 has not been shown and described in detail, as it can be implemented by any person skilled in the art on the basis of the information given above.

In order to prevent any wear on the conical piston tip 7*a* and the inner wall of the conical tapering end 17 of the suction pipe 5 at the end of the discharge stroke of the piston, the piston should be prevented from rotation about its axis relative to the suction pipe 5. Consequently, the piston 7 is preferably guided in the suction pipe 5 in such a manner that it is axially movable but not rotatable about its axis. This can be obtained by guiding the nut 8 in a very accurate manner in the square bore in the shaft 2 so as to prevent any rotation on the nut 8 about its axis. However, also other arrangements for preventing any rotation of the piston 7 about its axis while permitting an axial movement of the piston can be used.

Also other modifications of the pipetting and dosing device according to the invention are possible within the scope of the invention. Thus, the drive means for the piston may consist of a linear motor having its movable part connected coaxially with the piston. Also the coupling between the drive motor and the piston can be designed in any other suitable manner.

What is claimed is:

1. A pipetting and dosing device comprising an internally cylindrical suction pipe having a conically tapering distal end with a central opening at its apex, a piston axially movable within said suction pipe while sealing against the inner wall of the pipe, the end of said piston facing the distal end of the suction pipe being provided with a conical tip having an apex angle somewhat larger than the apex angle of the conically tapering end of the suction pipe, either of said conical tip of the piston and said conically tapering end of the suction pipe being made of a resiliently deformable material, so that upon movement of the piston into abutment against the conically tapering end of the suction pipe the conical tip of the piston and the conically tapering end of the suction pipe can, by a given elastic deformation of said deformable material, be brought into complete conformity without any residual interspace therebetween, drive means coupled to said piston for moving the piston axially over well-defined distances in said suction pipe for, respectively, sucking up and discharging predeterminable volumes of liquid through said opening, a support housing supporting said piston and said drive means, said suction pipe being attached to said support housing with its opposite end; pressure sensing transducer means disposed between said support housing and said opposite end of the suction pipe for detecting the prevailing axial force between the conical piston tip and the conically tapering end of the suction pipe and for generating a corresponding signal, and control means for said drive means, said control means being responsive to said transducer signal to interrupt the discharge movement of the piston when said force reaches a predetermined upper limit value sufficient for said given elastic deformation upon abutment of the conical piston tip against the conically tapering end of the suction pipe.

2. A device as claimed in claim 1, wherein said transducer means include at least one piezoelectric transducer.

3. A device as claimed in claim 1 comprising means for preventing rotation of the piston about its axis while permitting its axial movement in the suction pipe.

4. A device as claimed in claim 1, wherein said opening in the conically tapering end of the suction pipe is in direct communication with the ambient atmosphere.

5. A device as claimed in claim 1, wherein said control means uses the end position of the discharge movement of the piston as indicated by said signal from said transducer means as an initial position for determining the movement of the piston.

6. A device as claimed in claim 1, wherein said drive means comprise a synchronous motor, in particular a step motor, which is coupled to the piston through gearing means.

7. A device as claimed in claim 6, wherein said drive means include a screw driven by said motor and a nut on said screw, said nut being connected to said piston so as to be axially movable together with the piston.

8. A device as claimed in claim 1, wherein said drive means comprise a linear motor.

9. A device as claimed in claim 1, wherein said control means include a first counter driven in response to the operation of said drive means so as to define the instantaneous position of the piston within the suction pipe and at least one second counter setable in accordance with a desired position of the piston and means for comparing the counts in said two counters and for controlling the operation of the drive means in response thereto.

* * * * *